United States Patent [19]

Chapman et al.

[11] Patent Number: 4,783,880

[45] Date of Patent: Nov. 15, 1988

[54] DEMOUNTABLE URETHANE CASTER WHEEL TIRE

[75] Inventors: Howard H. Chapman, Bloomfield Hills; Robert F. Chapman, Troy, both of Mich.

[73] Assignee: Eagle Boring, Inc., Lapeer, Mich.

[21] Appl. No.: 19,346

[22] Filed: Feb. 26, 1987

[51] Int. Cl.$^4$ ............................................. B60B 33/00
[52] U.S. Cl. ......................................... 16/45; 16/36; 16/46; 301/63 D
[58] Field of Search ................... 16/30, 36, 45, 46, 47, 16/48, 97, 98, 107; 301/63 D, 63 DS, 63 PW, 95, 96, 97, 98

[56] References Cited

U.S. PATENT DOCUMENTS

| | | | |
|---|---|---|---|
| 1,716,311 | 6/1929 | Harris | 16/45 X |
| 1,743,757 | 1/1930 | Chesnutt | 16/36 X |
| 2,367,825 | 1/1945 | Shaw | 301/63 DS |
| 2,709,471 | 5/1955 | Smith et al. | 301/63 D X |
| 2,983,550 | 5/1961 | Gannett | 301/63 DS |

Primary Examiner—Fred A. Silverberg
Attorney, Agent, or Firm—Reising, Ethington, Barnard, Perry & Milton

[57] ABSTRACT

A caster wheel assembly for replacing a tire on a wheel member having a hub portion, a web portion extending radially outwardly from the hub portion, and a first laterally extending rim portion. A circular member including a web portion removably fastened to the web portion of the wheel member and a second rim portion extending laterally and projecting oppositely relative to the first rim portion, the rims together having a V-shaped tire support surface when viewed in cross section. The tire includes a ring member having an outer and inner surface and a resilient member adhered to the outer surface. The inner surface is V-shaped when viewed in cross section. A fastening mechanism fastens the circular member to the wheel member to clamp and deform the outer surface of the ring in a friction fit against the tire support surface.

1 Claim, 2 Drawing Sheets

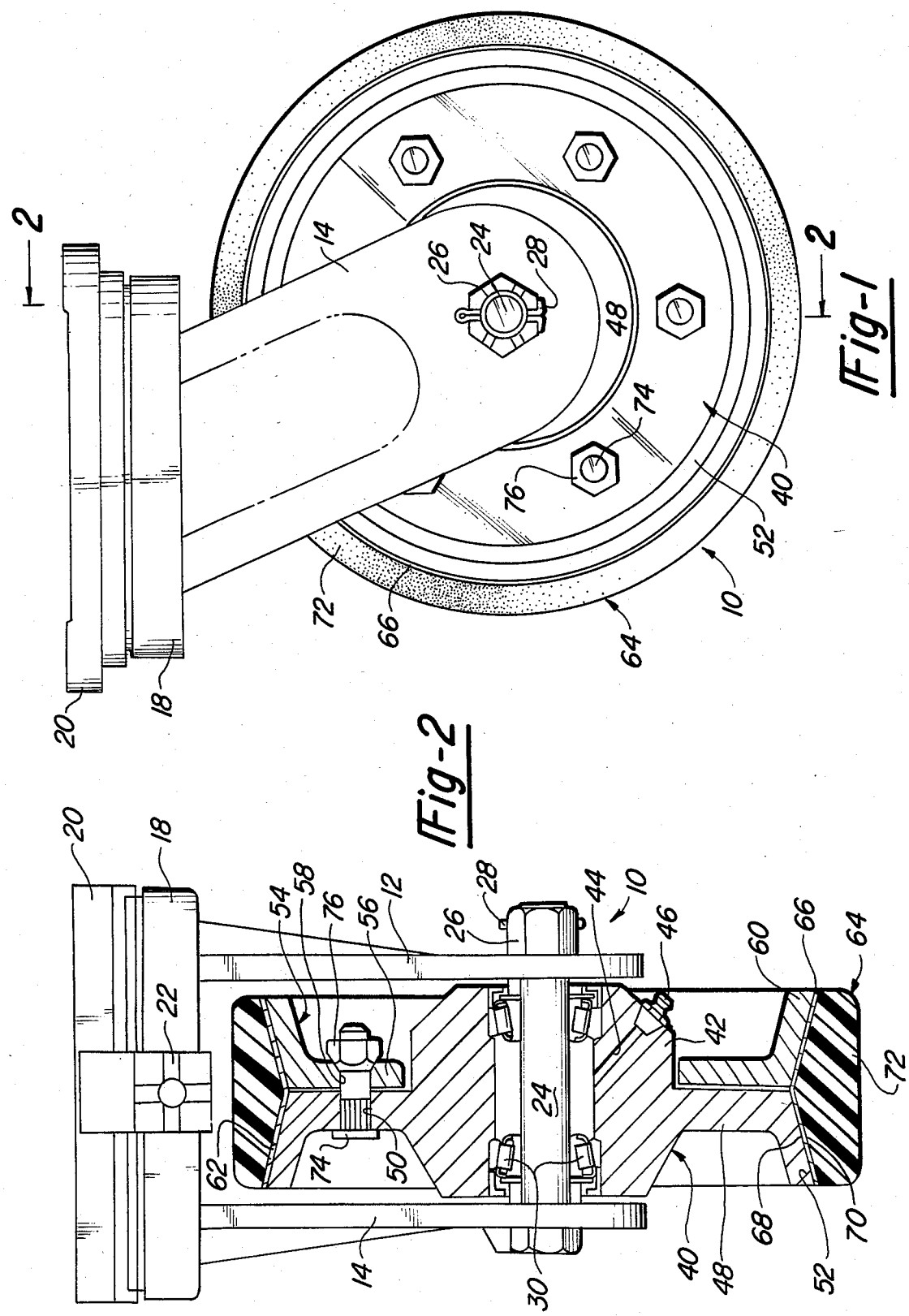

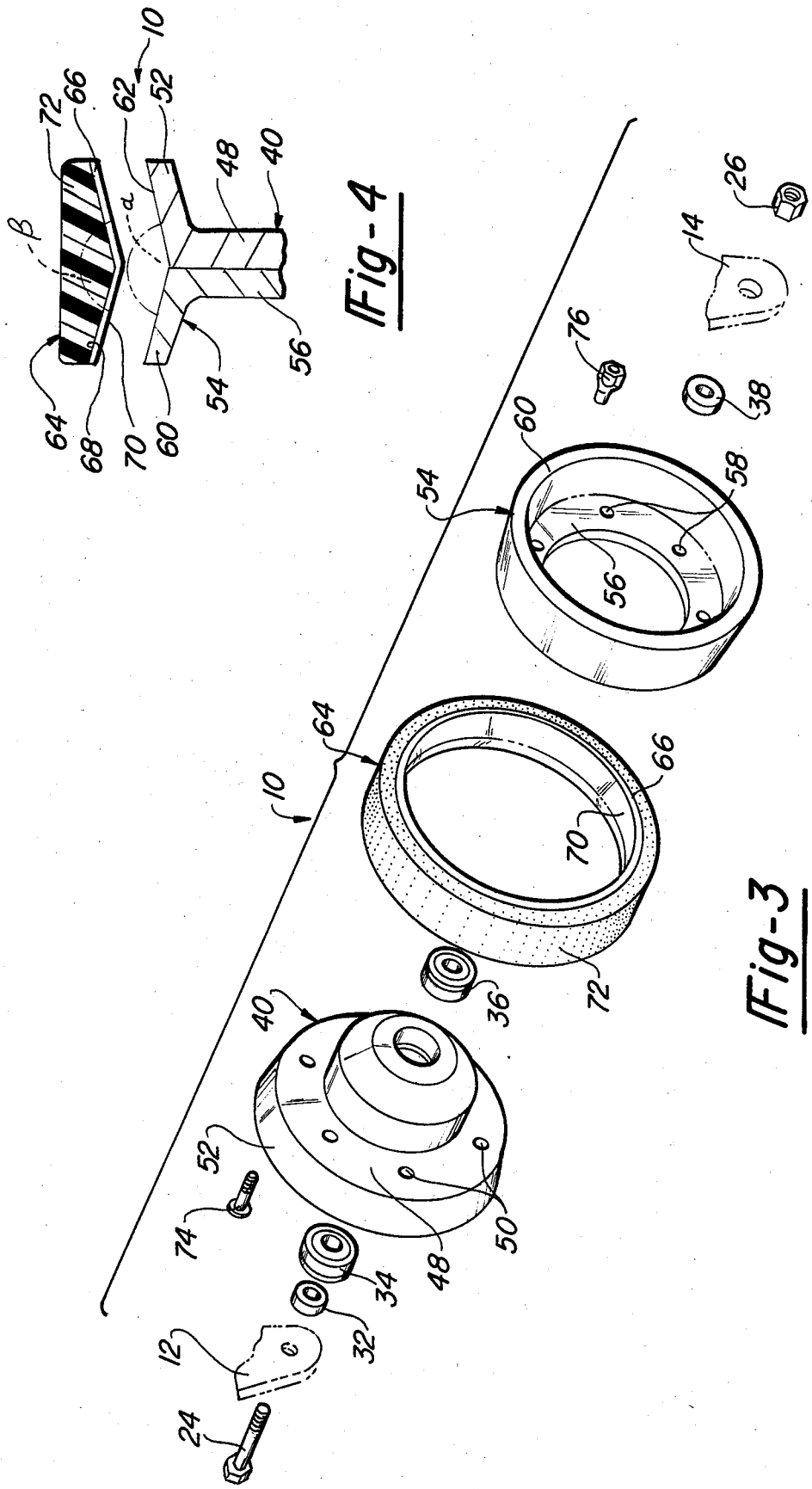

DEMOUNTABLE URETHANE CASTER WHEEL TIRE

FIELD OF THE INVENTION

This invention relates to a demountable tire industrial wheel and more particularly to a caster wheel having means for replacing the tire on the wheel.

DESCRIPTION OF RELATED ART

For at least half a century caster wheels have consisted of a cast metal wheel to which a layer of rubber or polyurethane has been adhered. When this layer wears down, the entire wheel must be removed from the vehicle and returned to the factory for recovering. Other assemblies have been manufactured wherein a rubber tire is clamped between complimentary rim parts.

For example, the U.S. Pat. Nos. 1,501,743 to Bowen, issued July 15, 1924 and 2,723,415 to Taylor et al, issued Nov. 15, 1955 disclose caster wheels including rubber tire portions clamped between flanges extending from two rim members. The Bowen patent discloses two circular plates including oppositely projecting flanges at their outer edges providing a flat rim. Each of the flanges has an outwardly extending marginal rib which is under cut so as to cooperate in defining a dove tail recess for the reception of a solid rubber tire. The Taylor et al patent discloses a structure functioning in substantially the same manner wherein a rubber tire is clamped between two rims projecting from a pair of oppositely projecting flanges.

The U.S. Pat. No. 2,943,889 to Woldring et al, issued July 5, 1960, discloses a somewhat similar structure wherein the rubber tire is mounted on a metal backing plate. The tire and plate are clamped between two members which are bolted together by two further outside members.

Replacement of the tire in any of the prior art assemblies requires the entire wheel to be removed from the vehicle and returned to the factory for recovering. The prior art assemblies further require a projecting lip extending from the support flanges for maintaining the tires in compression. This outer lip utilizes space between the support forks of the wheel support structure thereby requiring a smaller wheel surface to be contained therebetween.

The present invention eliminates the need to return the entire wheel to the factory for recovering. Additionally, the present invention does not require the additional lip extending outside the lateral aspects of the tire to maintain the tire in compression.

SUMMARY OF THE INVENTION

The present invention provides a caster wheel assembly including a wheel member having a hub portion, a web portion extending radially outwardly from the hub portion, and a first laterally extending rim portion. A circular member includes a web portion removably fastened to the web portion of the wheel member and a second rim portion extending laterally and projecting oppositely relative to the first rim portion, and the rims together having a V-shaped tire support surface when viewed in cross section. A tire includes a ring member having an outer and inner surface and a resilient member adhered to the outer surface. The inner surface is V-shaped when viewed in cross secton. Fastening means fastens the circular member to the wheel member to clamp and deform the outer surface of the ring in a friction fit against the tire support surface.

BRIEF DESCRIPTION OF THE DRAWINGS

FIG. 1 is a side elevational view of a wheel assembly constructed in accordance with the present invention mounted on a wheel support;

FIG. 2 is a cross sectional view taken substantially along lines 2—2 of FIG. 1;

FIG. 3 is a exploded perspective view of the present invention; and

FIG. 4 is a fragmentary cross sectional view of the tire disassembled from the wheel assembly.

DESCRIPTION OF THE PREFERRED EMBODIMENT

A caster wheel assembly constructed in accordance with the present invention is generally shown at 10 in the Figures.

The wheel assembly 10 is mounted on wheel support forks 12,14 common in the art. The forks 12,14 extend from a support member 16 mounted on a trolley 20 and secured thereto by fasteners 22. An axle 24 is supported by the forks 12,14 and is secured in place by a sloted axle hex nut 26 and pin 28. Bearings 30, common in the art, are used to provide a bearing surface between the wheel assembly 10 and the axle 24. Washers 32,34,36,38 are disposed between the inner surface of the forks 12,14 and the wheel assembly 10.

The caster wheel assembly 10 includes a wheel member generally indicated at 40. The wheel member 40 includes a hub portion 42 mounted on the axle 24 and bearings 30. The hub 42 includes a lubrication port 44 for the delivery of lubrication to the area of the hub 42 mounted on the axle 24. A cap member 46 covers the port 44 and is removable.

A web portion 48 extends radially outwardly from the hub portion 42. The web portion 48 includes a plurality of openings 50 extending therethrough. A first laterally extending rim portion or flange 50 extends from the hub portion 48.

A circular member, generally indicated at 54, includes a web portion 56 having openings 58 extending therethrough, the openings 58 being complimentary in position to the openings 50. The web portion 56 is removably fastened to the web portion 48 of the wheel member 40. The circular member 54 includes a second rim portion or flange 60 extending laterally and projecting oppositely relative to the first rim portion 52. The rim portions 52,60 define a tire support surface 62. The tire support surface 62 includes the two flat surfaces of the rim portions 52,60 defining a V-shaped when viewed in cross section, as shown in FIGS. 2 and 4. As shown in FIG. 4, the tire support surface 62 defines an interior angle $\alpha$.

A tire generally indicated at 64, includes a metallic ring member 66. The ring member 66 has outer and inner surfaces, 68,70 respectively. A resilient member 72 is adhered to the outer surface 68 of the ring member 66. The resilient member 72 can be made from rubber, urethane, or other natural or man made resilient materials commonly known in the art.

The inner surface 70 of the ring member 66 is V-shaped when viewed in cross section. As shown in FIG. 4, the inner surface 70 defines an interior angle $\beta$. The assembly 10 includes a plurality of fasteners 74,76 for fastening the circular member 54 to the wheel member 40 to clamp and/or form the inner surface 70 of the ring member 66 in a friction fit against the tire support surface 62. This construction provides a new caster wheel that eliminates the need to return the wheel to the factory for recovering because replacement of the tire can be accomplished by removal of the circular member 54 and removal of the resilient member 62 and ring member 66 adhered thereto. A new resilient member 72 mounted on a new ring member 66 is then placed on the wheel member 40 and secured thereto by the assembly of the circular member 54 onto the wheel member 40. The only item that needs to be replaced is the resilient member 72 which is adhered to a new tire ring 66.

The V-shape of the tire support surface 62 defines the interior angle $\alpha$ and the V-shaped inner surface 70 of the ring member 66 defines an interior angle $\beta$, as shown in FIG. 4. The angle $\beta$ is greater than the angle $\alpha$ whereby the fastening of the circular member 54 to the wheel member 40 clamps the ring member 66 between the rims 52 and 60. Since the inner surface 70 of the metallic ring member 66 defines a greater interior angle $\beta$ than the angle defined by the tire mounting surface 62, the ring member 66 is held in a interference fit providing a frictional grip along the entire surface 70. This fit obviates the need of the additional lip extending outside the lateral aspects of the tire 64 as required by prior art assemblies.

Preferably, and as shown in the drawings, the angle $\alpha$ is 150°. The angle $\beta$ need only be slightly greater than 150° to produce the interference fit. These angles may be adjusted and yet still remain within the parameters of the present invention.

The tire support surface 62 includes the two surfaces of the rim portions 52 and 60 which are flat surfaces defining the V-shape when viewed in cross section.

The invention has been described in an illustrative manner, and it is to be understood that the terminology which has been used is intended to be in the nature of words of description rather than of limitation.

While specific embodiments of the invention have been illustrated in the accompanying drawings and described in the foregoing specification, it should be understood that the invention is not limited to the specific construction shown. Alternatives in the construction and arrangement of parts, all falling within the scope and spirit of the invention, will be apparent to those skilled in the art.

What is claimed:

1. A caster wheel assembly (10) comprising: a wheel member (40) including a hub portion (42), a web portion (48) extending radially outwardly from said hub portion (42), and a first laterally extending rim portion (52); a circular member (54) including a web portion (56) removably fastened to said web portion (48) of said wheel member (40) and a second rim portion (60) extending laterally and projecting oppositely relative to said first rim portion (52), said rim portions (52,60) together having a V-shaped tire support surface (62) when viewed in cross section; a tire (64) consisting of a solid annular thin one piece metallic band member (66) having an outer and inner surface (68,70) and a solid one piece resilient member (72) having an inner surface adhered to said outer surface (68) of said band member (66), said resilient member having an outer tread, said inner surface (70) being V-shaped when viewed in cross section, and fastening means for fastening said circular member (54) to said wheel member (40) to clamp and deform said inner surface (70) of said band member (66) in a friction fit against said tire support surface (62) for preventing deflection of said resilient member (72) under heavy loads, said V-shape of said tire support surface (62) defines an interior angle $\alpha$ and said V-shaped inner surface (70) of said band member (66) defines an interior angle $\beta$, $\beta$ being greater than $\alpha$ placing the resilient member at least adjacent the tire support surface in compression to prevent rubber defection under heavy loads.

* * * * *